Sept. 22, 1931.   A. ALLEN   1,824,745
MEANS FOR MEASURING CHARACTERISTICS OF MATERIAL
Filed Feb. 8, 1927   5 Sheets-Sheet 1
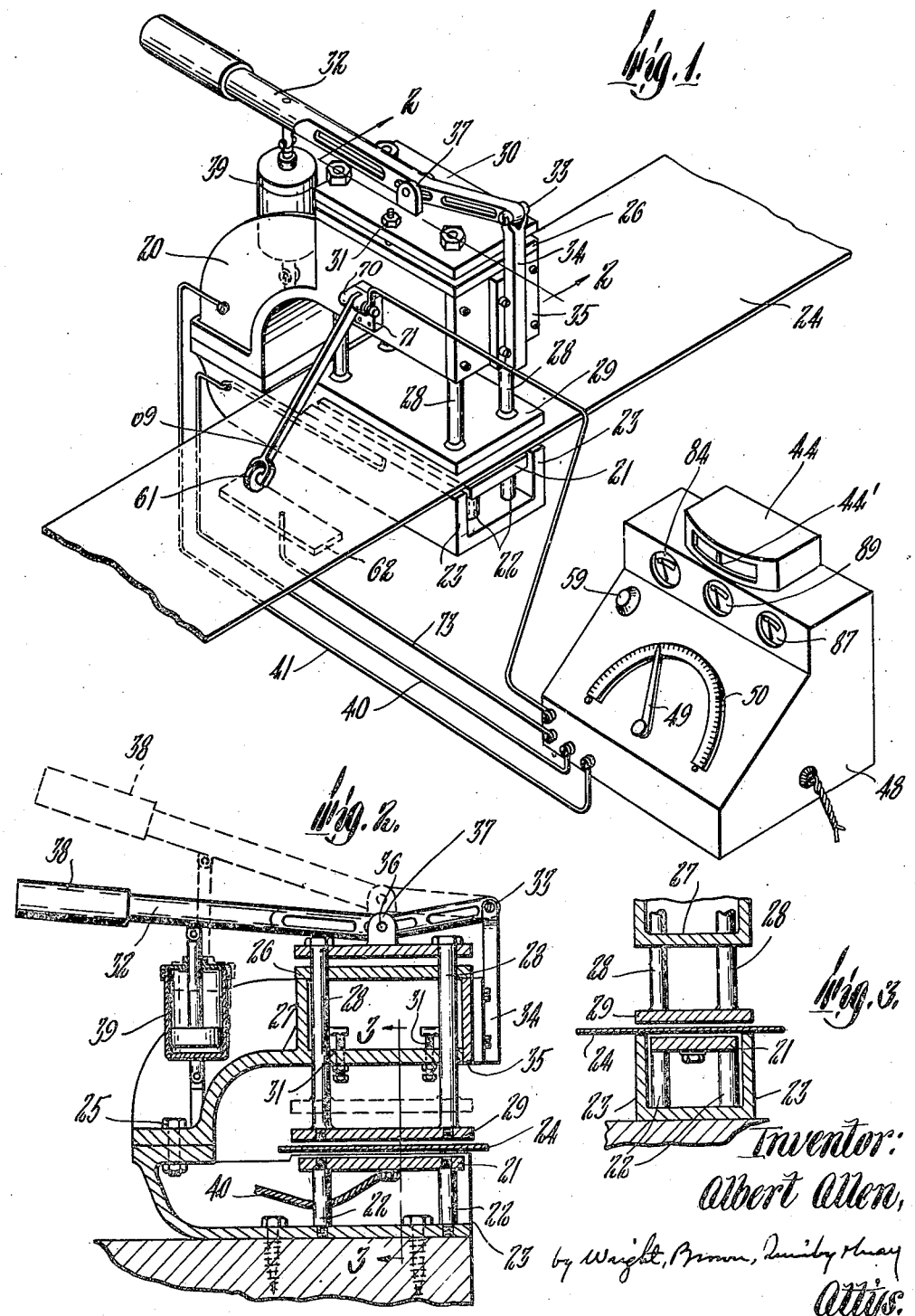

Inventor:
Albert Allen,
by Wright, Brown, Quinby & May
attys.

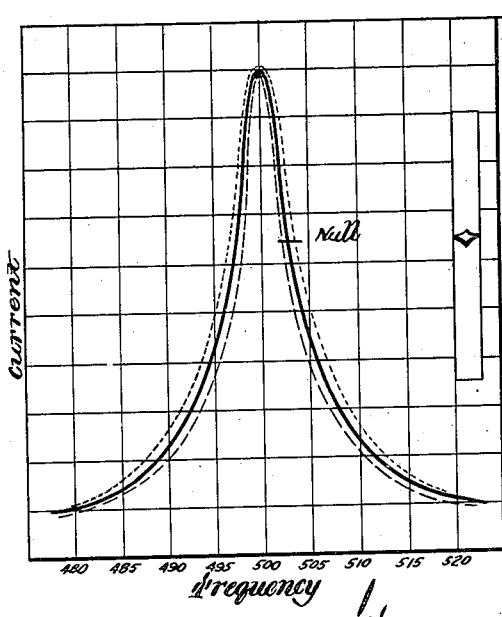
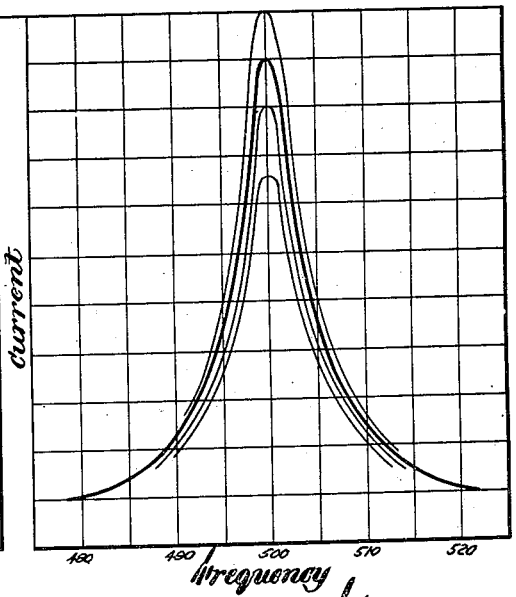
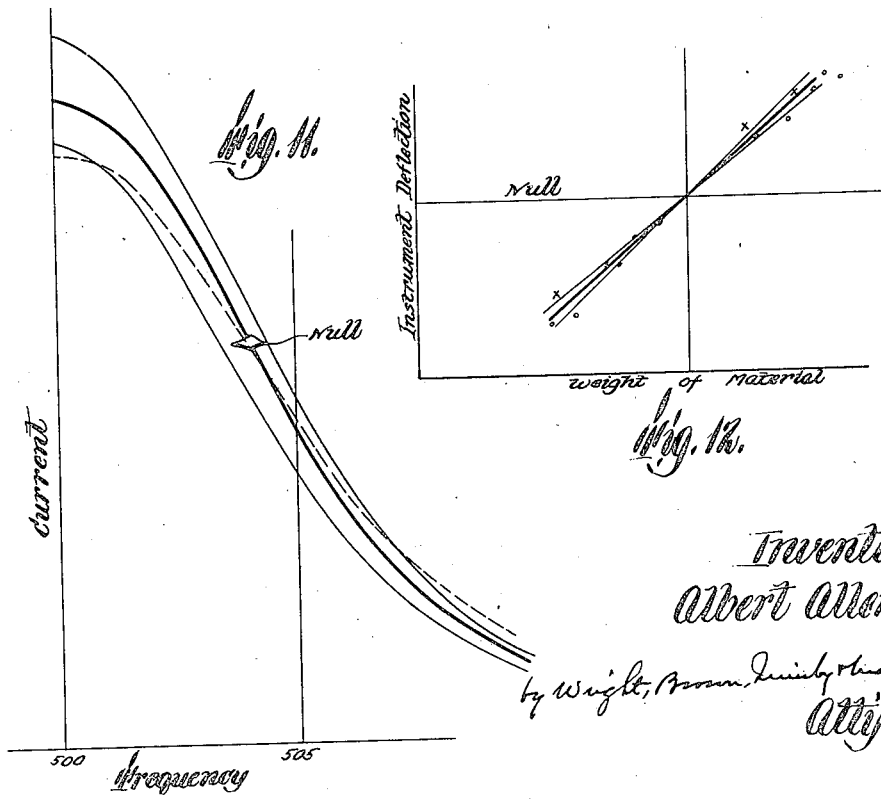

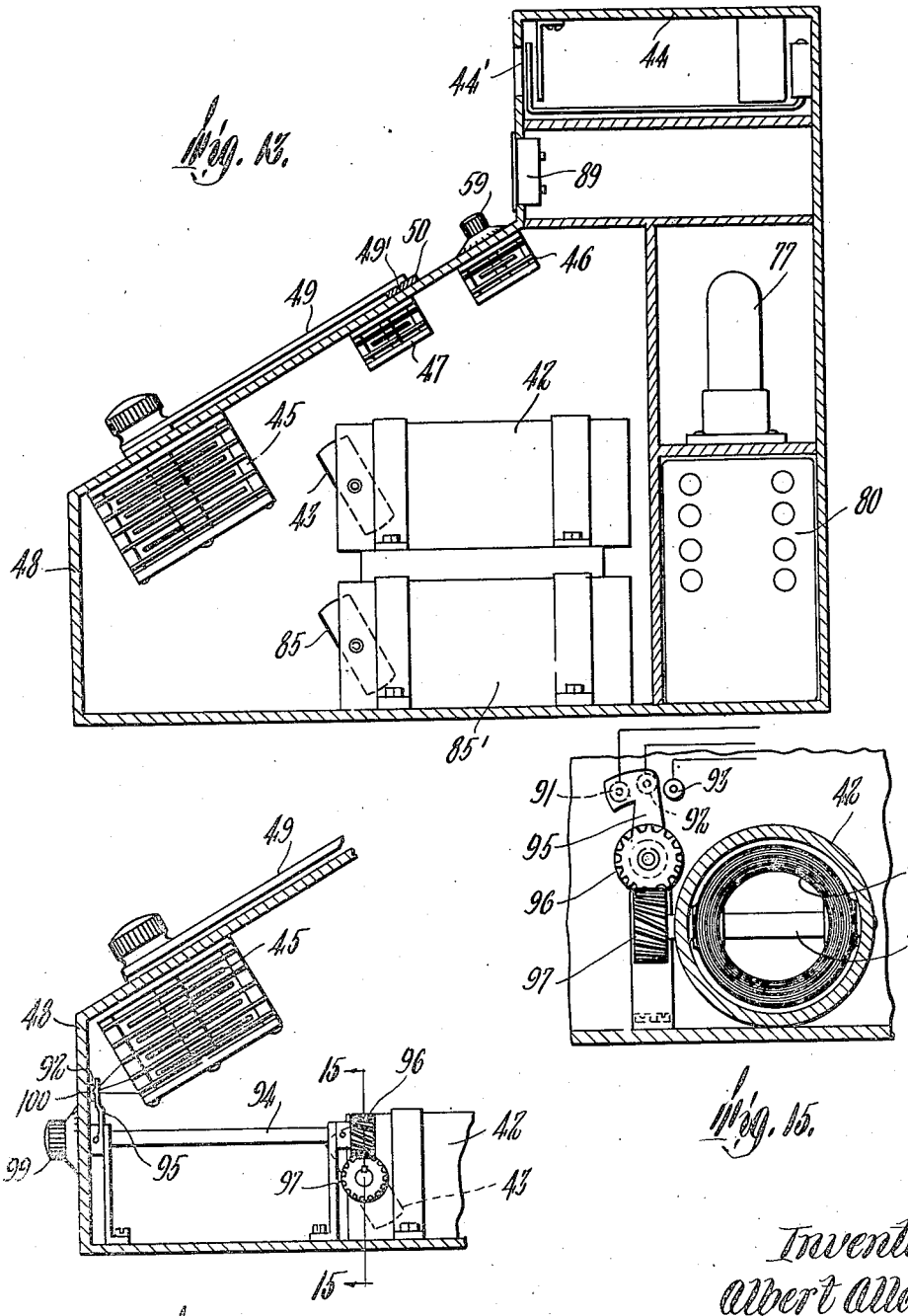

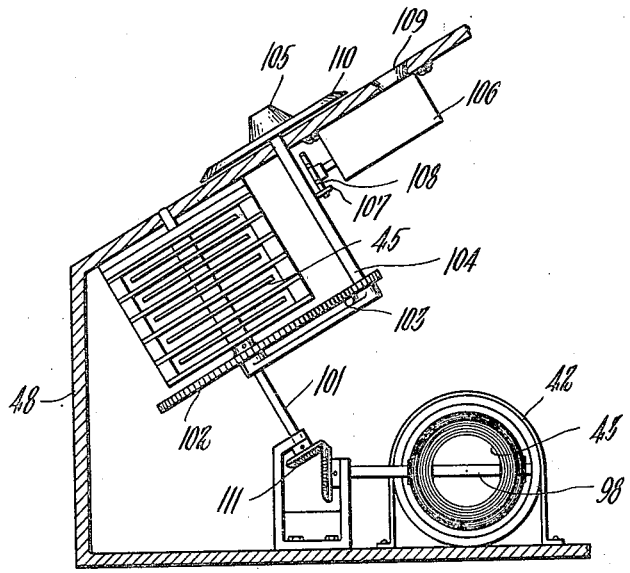
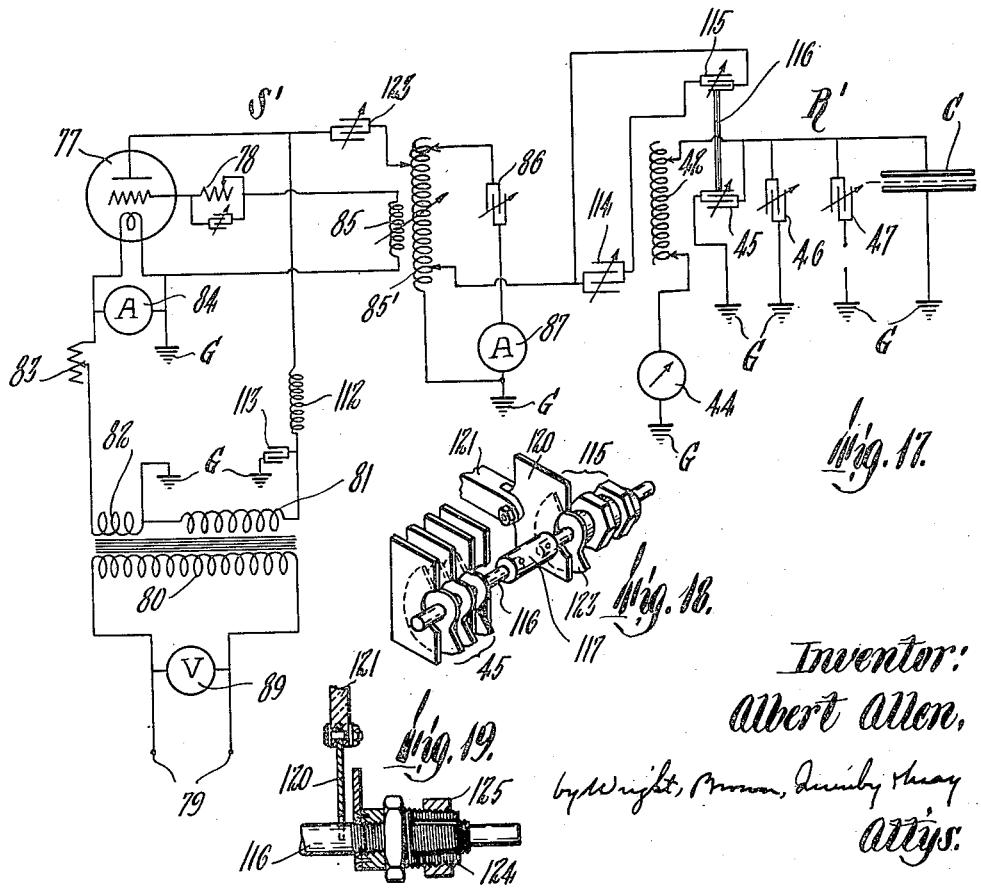

Patented Sept. 22, 1931

1,824,745

UNITED STATES PATENT OFFICE

ALBERT ALLEN, OF WINCHESTER, MASSACHUSETTS, ASSIGNOR TO ATLANTIC PRECISION INSTRUMENT COMPANY, OF BOSTON, MASSACHUSETTS, A CORPORATION OF MASSACHUSETTS

MEANS FOR MEASURING CHARACTERISTICS OF MATERIAL

Application filed February 8, 1927. Serial No. 166,705.

This invention has to do with the measuring of the characteristics of material by a method and means which do not require that portions of the material to be tested shall be segregated from the mass or that any physical or chemical changes be made therein for such determination. Broadly stated, this may be done by causing changes in such characteristics to effect corresponding changes in electrical properties of suitable devices, and measuring such electrical properties and changes therein in terms of such desired characteristics or changes thereof. Values of certain electrical properties such as capacity and inductance are capable of very accurate measurement, particularly by the use of alternating electrical currents of high frequency.

The materials to be tested may be made to affect capacity by being substituted to a greater or less extent for the air between the conducting plates of an air condenser thus to change the capacity of the condenser by reason of the dielectric properties of the material differing from those of air. This is disclosed and claimed in my Patent No. 1,708,074, granted April 9, 1929, for Indicating and controlling method and mechanism for paper making machines and the like. The capacity of the condenser will thus be affected when the material to be tested is introduced between the plates thereof and when any characteristics which change its dielectric properties change.

In some cases the material to be tested may not itself be passed between the condenser plates, but instead may be brought into controlling relation to some substance between such plates whose dielectric properties are responsive to the characteristic sought to be measured. For example, as shown in my Patent No. 1,708,073, granted April 9, 1929, for Method and mechanism for determining the moisture content of paper or other material, a hygroscopic dielectric between the plates may be employed, variations in the moisture content of which act to change its dielectric properties and thus the capacity of the condenser. As such changes are produced by corresponding variations in moisture content of the material to be tested, which is in controlling relation thereto, the capacity changes measure moisture changes in the material to be tested.

Changes in capacity may be caused by changes in the dielectric properties of the material or substances responsive thereto as by varying proportions of ingredients having different electrical characteristics, e. g. rubber compounds containing different proportions of rubber, sulphur and filler, or a wet web of paper having variable moisture content, or fabric with a layer of other material thereon, or with an impregnating compound therein. Such variations in capacity may be effected without movement of the condenser plates toward or from each other by varying only the ratios of air and other material between the plates. Any physical characteristic may be measured which affects the capacity of the condenser, provided only that other characteristics, changes in which would also effect capacity, are kept sufficiently constant, or are corrected for in any particular instance.

It is not necessary in all cases, however, to utilize electrical characteristics of the material to be tested or electrical characteristics of substances responsive in any way to such material, responsive for example in such manner as to affect their dielectric or conducting properties. Thus certain characteristics of material may be measured through the use of instrumentalities mechanically responding thereto which may be caused to change by mechanical means either capacity or inductance or both. Such changes in capacity may be effected by moving the plates of a variable condenser from or toward each other, and may be effected in inductance by actuating a variable inductance such as one wherein the inductive relation of certain coils or the number of active turns of such coils may be changed. For example, moisture content of the material may be used through devices or mechanisms responsive thereto to effect mechanical motion thereby to control such devices in accordance with such moisture content as more fully disclosed and claimed in my application Serial No. 152,126, filed December 2, 1926, for Hygrometers.

While inductance variations are equivalent to capacity changes in so far as effecting changes in frequency are concerned, nevertheless capacity changes are in general easier to effect by changes in the material which it is desired to test, and capacity effects will therefore be the more fully treated in this application.

Since by this general method it is quite unnecessary to segregate portions of the material to be tested or to effect physical or chemical changes therein, and since such changes in electrical properties, except where effected through mechanical means or responsive substances are instantaneous with changes of characteristics to be tested, and when effected through such means or responsive substances are usually sufficiently rapid where the changes from time to time are not violent, this method lends itself well to continuous indications of the desired characteristics of materials as they are moving in continuous lengths as in the process of manufacture. Thus it finds important application to the measuring of running weights of sheet material, as, for example, paper, rubber, saturated fabric, etc. in continuous sheeted or other form.

High frequency alternating currents may be used for measuring the values of these electrical properties in the following manner. High frequency oscillations are produced in a sending or exciting circuit of a suitable character, such, for example, as is used or is suitable for use in a radio sending station.

The frequency of oscillation is a function of the inductance and capacity of the circuit. More or less loosely coupled to this exciting or sending circuit is a closed pick-up or receiving circuit having an oscillation period dependent on its inductance and capacity. The exciting and pick up circuits thus constitute in effect the primary and secondary circuits, respectively, of a high frequency transformer mechanism. The nearer these two circuits are tuned to the same frequency, the larger the current flow induced in the pick-up circuit by the exciting circuit, this current being at a maximum value when the two circuits are tuned to the same frequency, the circuits then being in resonance. If in either of these circuits the inductance or capacity, or both, is made to any extent dependent in amount on any characteristics of the material to be measured or tested, as may be done as has heretofore been indicated, the nearness to, or departure from, resonance of the two circuits, and thus the current flow in the pick-up or secondary circuit, will be dependent on the amount of such characteristics, and variations from time to time in such characteristics, will be evidenced by resultant changes in the current flow in the pick-up circuit. Or changes in voltage at terminals of a pick-up circuit open except through the voltmeter, may be obtained instead of changes in current in a closed pick-up circuit. Or, if desired, variations in inductance or capacity of either circuit necessary to maintain constant current flow in the pick-up circuit, other conditions being constant, may be used as a measure of change of such characteristics. The current measuring method is usually preferable, however, and in most cases there are certain very marked advantages in so proportioning the inductance and capacity values in the two circuits that variations due to the material being measured or tested shall lie wholly at one side of the resonance point. This, therefore, is regarded as a very important feature and will be discussed at greater length later.

Either method makes possible the checking of the amount of a characteristic of material against a standard, thus to indicate variations from a desired condition, and as a further step automatic control of manufacturing conditions so as to tend to maintain a desired characteristic at a constant predetermined value.

For the purpose of utilizing the method as hereinbefore described this invention includes also certain devices, instruments and mechanism as will hereinafter appear. Beside various constructions designed with particular reference to their particular function in connection with various materials to be measured, this invention includes instruments for indicating the desired measurements. In connection with such instruments one particular object has been to provide means by which such an instrument may be readily calibrated to give direct reading of the desired characteristic that approximately matches that of a given sample and to effect a quick and easy check from time to time verifying the normality of conditions and adjustments of all working parts of the instrument, thereby adapting it to be used more conveniently and with less liability to alteration of adjustments during use.

More specifically, one object of this invention is to provide means whereby the instrument can be set quickly and without the exercise of skill at a calibration point, found through the use of a sample to be matched within predetermined limits, such that the instrument thus set shall give direct readings in terms of the desired characteristic of materials exactly or nearly like the sample.

Another object is to provide means for quick and accurate re-establishment of any calibration point previously so determined, without recalibration through repeated use of the said sample.

Another object is to furnish means for unmistakable and exact checking of any such calibration point by recomparison with the sample whereby it was originally established, or with a secondary standard of equivalent effect, but made of a material more permanent or more suitable for keeping in a standard file.

A further object is to provide a combination of parts and circuits such that when the material which is being tested is withdrawn from operating relation to the instrument between the plates of the condenser whereby such characteristic is recognized, the indicating elements of the apparatus are returned to a "null" "normal", or mid-scale reading if all parts are in normal condition and relation, and all of the adjustments are correct, thereby indicating such correctness. This return is preferably automatic and due solely to the withdrawal of the material from between the condenser plates but may be accomplished alternatively by simple manually-controlled means.

For a more complete understanding of this invention, reference may be had to the accompanying drawings illustrating its application to various industries, these being selected merely by way of example. In these drawings, Figure 1 shows in perspective somewhat diagrammatically an apparatus by which running weight of a traveling web may be measured and indicated.

Figure 2 is a vertical section through a condenser mechanism used in connection with this apparatus, the section being taken substantially along the line 2—2 of Fig. 1.

Figure 3 is a detail transverse section on line 3—3 of Figure 2.

Figure 9 shows a family of resonance curves illustrating the effect of variable losses with the same deflection produced by changes of coupling between the circuits.

Figure 10 is a somewhat similar diagram but without change of coupling to produce the same deflection.

Figure 11 is a graphical representation of the effect of variable losses as resonance is more or less departed from due to weight variations of material being measured.

Figure 12 is an instrument calibration curve.

Figure 13 is a cross section through the indicating instrument, the wiring being omitted for the sake of clarity.

Figure 14 is a fragmentary view similar to a portion of Figure 13 but showing a modification.

Figure 15 is a sectional detail showing means for modifying the coupling between the exciting and pick-up circuits.

Figure 16 is a fragmentary sectional view of a further modification.

Figure 17 is a diagram of another arrangement of electric circuits alternative to that shown in Figure 4.

Figure 18 shows in perspective a portion of the mechanism indicated diagrammatically in Figure 17.

Figure 19 is a detail section through the correction condenser shown in Figures 17 and 18.

Figure 4:
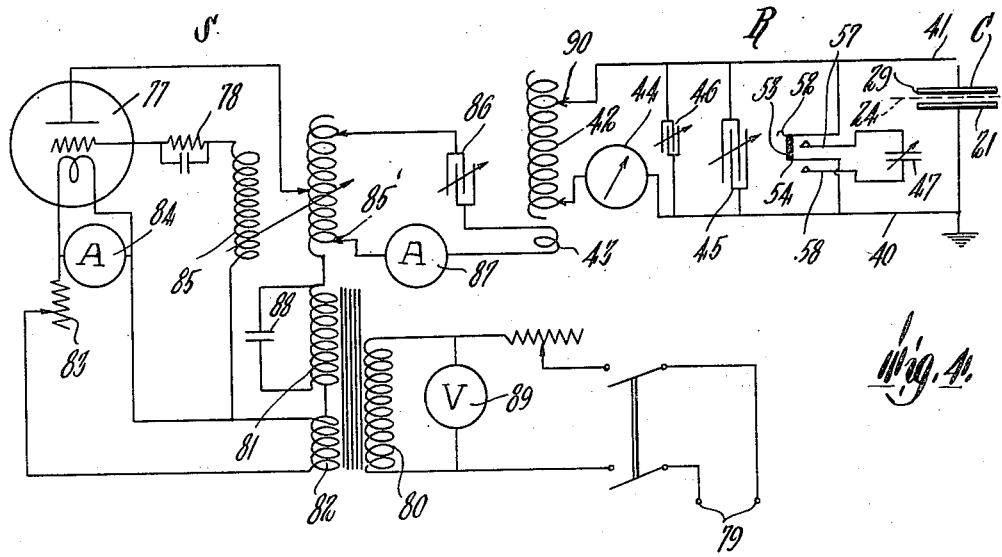
Figure 4 is a diagram of one arrangement of electric circuits that may be used.

The particular drawings selected for more fully disclosing the principle of my invention show the preferred constructions of instruments and associated mechanisms where a single characteristic uncorrected for others is to be measured, such characteristic commonly being the running weight of nonconducting sheet material where such sheet material is passing between the condenser plates. When a pair of conductive condenser plates are separated by an air gap of fixed amount, it possesses a certain capacity dependent on the areas of the plates and their spacing. If now instead of an air gap between the plates, a different dielectric of the same thickness as the gap be introduced, the capacity is modified to an extent depending on the particular dielectric used. If, however, the areas and spacing of the plates remaining unchanged, another dielectric material than air of less thickness than the gap be introduced between the plate, the effective dielectric between the plates comprises partly this material so introduced and the remainder the air filling the space between the dielectric and the plates and any interstices of the dielectric, and the resultant capacity of the condenser is then somewhere intermediate those resulting from air gap alone and from the other dielectric alone, approaching those of the air alone, or those of the other dielectric alone, according as the quantity of such other dielectric is small or large, respectively, relative to the quantity of the air between the plates. The quantity of the other dielectric being proportional to its mass, the change in capacity of the condenser from those where air is the sole dielectric thus becomes a function of the mass of the other dielectric between the plates.

In place of a stationary dielectric between the plates, it is evident that this dielectric could be in the form of a continuous web or sheet passed progressively between the plates, that mass of the web or sheet between the plates at any one instant being the determining factor for the capacity at that instant if all other factors remain constant. Since the plate areas are constant, the mass of the web therebetween is directly proportional to the weight of the web for unit length, assuming its composition as constant, and hence the changes in capacity become a measure of the changes of running weight of the web.

The spacing of the condenser plates by a fixed amount greater than the maximum thickness of the material to be tested permits free travel of the web and also eliminates the spacing as a variable function in the capacity measurement of the condenser.

As this mechanism will be described as intended for measurement of running weight of moving material which ought to be held continuously to the weight of a standard sample of that material which is a usual condition, the indication desired is commonly one best given by a standard or normal reading, indicating coincidence; plus or minus departures therefrom indicating excessive or deficient weight, respectively.

Conversion of instrument readings to weight in pounds per unit of area or the like, is most simply obtained by the intermediate calibrating step of establishing such adjustments as will give the "normal" or "null" reading when the weighing condenser contains the standard sample, which has a known weight in pounds per unit of area; and then further converting to a weight correction, through previous calibration, any deflections of the instrument above or below that so-established null reading indicating the standard.

In other words, weighing by means of this apparatus is one remove more complicated than gravitational weighing for the reason that while a result in gravitational terms is sought, a property other than gravitational attraction is measured, so that in designing the instrument it is important to have such adjustments and methods of operation as will facilitate the conversion of the electrical response to a weight indication with minimum instrumental and incidental errors; and the checking as often as may be necessary of the "normal" or "null" setting without materials between the plates of the measuring condenser. The electrical effect measured is correlated with the gravitational weight desired by the method and means hereinafter disclosed and specified.

While the condenser C through which the material is passed during the determination of the weight or other characteristic of the same may be variously constructed, it is important that the spacing between the plates thereof be accurately adjusted so as to be constant during the operation of the mechanism. One construction is illustrated in Figures 1, 2 and 3, in which it will be seen that a rigid U-shaped frame 20 of channel cross section is provided, the plate 21 being supported within the lower channel portion of this frame on suitable insulating posts 22. Preferably the upper face of the plate 21 is slightly below the top edges of the side flanges 23 of this frame in order to prevent the material which is being tested, which is herein shown as a sheet or web 24, from dragging over the upper face of this plate and thus subjecting it to wear which would act to change the effective spacing of the plates. As shown the frame is made in two parts fixed together as by means of the bolts 25 and the upper member of this frame is provided with a top cover or limiting plate 26. Extending through suitable perforations in this plate 26 and the web 27 of this portion of the frame are guide posts 28, to the lower end of which is rigidly fixed the condenser plate 29. These guide posts 28 are slidable through the perforations and are held at their upper ends in a plate 30. Adjusting screws 31, normally engaging stop pins on the guide posts 28 determine the spacing between the condenser plates 21 and 29.

It sometimes happens that a wider spacing between these condenser plates may be desirable momentarily in order to permit thick portions of the material to pass therebetween freely, as for example, joints in the material. For this purpose means may be provided by which the plate 29 may be raised so as to permit this wider spacing and then when desired permitted to descend into exactly the same spaced relation to the plate 21 as previous to such raising action. A means for accomplishing this may comprise the hand lever 32 fulcrumed at 33 on a rigid bar 34 fixed to an end plate 35 on the upper frame section, this lever being pivotally connected as at 36 through a slot therein with one or more ears 37 extending upwardly from the plate 30. The free end of this lever 32 is shown as provided with a handle 38 by which it may be manually manipulated. In order that the condenser plate 29 may be brought back with extreme accuracy after being raised, means may be provided to cushion its descent when the handle 38 is released. For this purpose the dash-pot shown at 39 may be connected thereto. A conductor 40 insulated from the frame member 20 is electrically connected to the condenser plate 21 and extends through this frame member to the indicating instrument, and a conductor 41 fixed to the frame member 20 and through this being in electrical connection with the plate 29 may also be led to the indicating instrument, it being important, however, that these conductors should be spaced sufficiently to avoid appreciable intercapacity effects which might impair the accuracy of the instrument readings. It is particularly important that the lead 40 be of such rigidity and so secured that its position relative to grounded metal shall remain fixed, since any change in such position will cause a change in lead capacity and therefore a change in indication of the instrument 44, 44'.

In Figure 4, S represents an exciting high frequency oscillatory circuit of any suitable description inductively coupled to which more or less loosely is a closed oscillatory or receiving pick-up circuit R comprising a secondary winding 42 in inductive relation to the primary 43 of the exciting circuit, said coil 42 being serially connected with the thermo-ammeter 44 and the condenser C comprising the plates 21, 29 through which passes the sheeted material 24, one of the characteristics of which is to be determined, a variable condenser 45 and vernier condenser 46 being connected in parallel with said condenser C.

As shown in Figure 17, hereinafter more fully described, the exciting and receiving circuits may be coupled capacitively.

The operation of the apparatus generally, so far described has been set forth in detail in my Patent No. 1,708,073, granted April 9, 1929.

Briefly stated, such operation is as follows, viz.:—The frequency natural to the receiving circuit R when a sheet of given material is interposed between the plates of the condenser C preferably is somewhat different from that of the oscillations developed by the circuit S but sufficiently near to cause measurable induced current flow therein, and the current flow through the circuit R will be indicated by the instrument 44 having a pointer 44'. Any variation in the capacity of the condenser C caused by a variation in the weight or one of the other characteristics of the sheet material 24 will vary the natural period of the receiving circuit and a corresponding indication given by the instrument 44.

Figure 6:
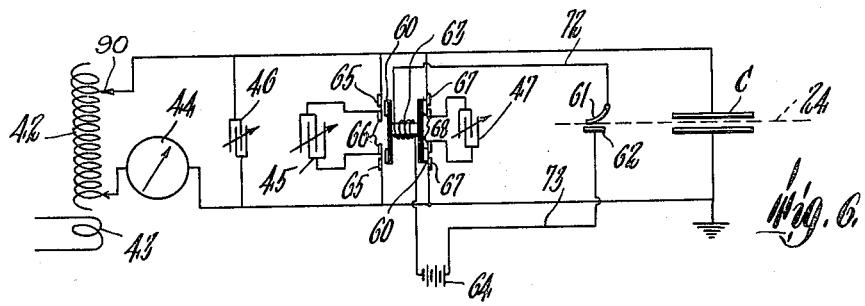
Figure 6 is a diagrammatic view of a modified pick-up circuit having an automatically acting air check.
Figure 7:
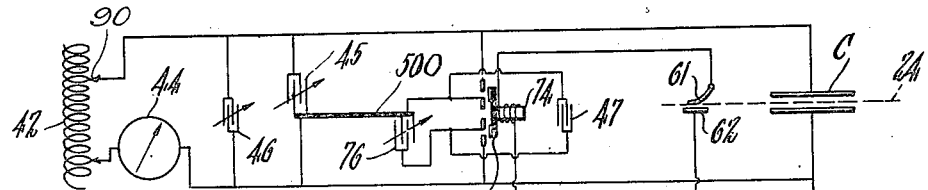
Figure 7 is a view similar to Figure 6 but showing a modified form of automatically acting air check employing "head and tail" condensers.

It is desirable to check from time to time the normality of the apparatus when no solid dielectric is between the condenser plates 21 and 29. For this purpose a variable condenser 47 previously adjusted but normally out of action in the apparatus, is arranged to be substituted when desired for the condenser 45, such substitution being manual (Figures 4 and 5) or automatic when there is no solid dielectric passing between the plates of the condenser C (Figures 6 and 7).

It will be obvious to those skilled in the art that such substitution of said condenser 47 for the condenser 45 may be effected either manually or automatically in a variety of ways, and that therefore the particular mechanism and circuital arrangements described are to be considered merely as illustrative and not as restrictive.

Figures 5, 8:
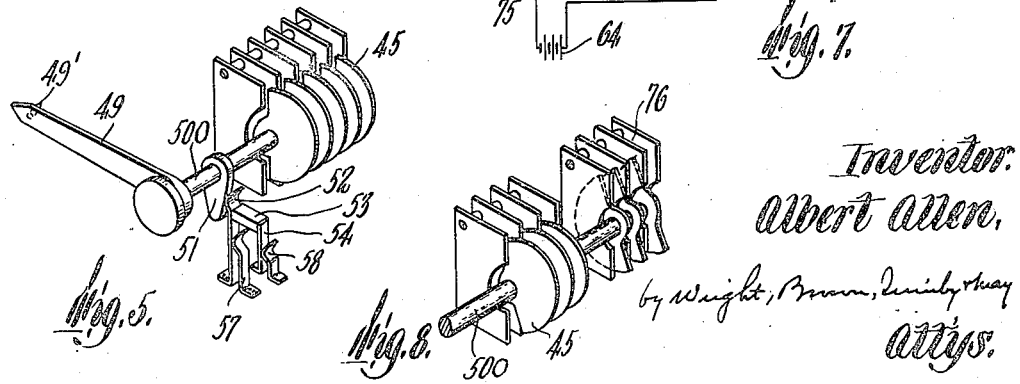
Figure 5 is a detail in perspective of a control.
Figure 8 is a perspective view of the "head and tail" condensers shown conventionally in Figure 6.

One of the various means for effecting the manual substitution of the condenser 47 for the condenser 45 is shown in Figures 4 and 5, in which the condenser 45 mounted on the interior of the casing 48 (Figures 13, 14) is controlled by the arm 49 rigidly connected to the shaft 50 which carries the rotor plates of said condenser 45, the said arm being arranged on the outside of said casing and co-operating with the graduated dial 50. Located within said casing is a cam 51 carried by the shaft 500 and co-operating with the spring switch member 52, operatively connected as by the insulation block 53 with the switch member 54. The terminals of the condenser 45 are normally connected with the spring members 52, 54, respectively, and said condenser 45 is normally in parallel with the condenser C.

The terminals of the condenser 47 are connected respectively to the spring clips 57, 58 which normally are out of contact with the switch members 52, 54 respectively, but when the arm 49 is turned to bring the condenser 45 to substantially zero position, the spring members 52, 54, respectively, make contact with the clips 57, 58, thereby connecting the checking condenser 47 in multiple with the condenser C, the vernier condenser 46 at all times remaining in circuit. The condenser 45 being practically at its zero position (Figure 5) when the checking condenser 47 is thrown into circuit, the result is equivalent to throwing condenser 45 out of circuit, the capacity between the edges of the rotor and stator plates of said condenser 45 being negligible, and, in any event, constant. The arm 49 which, as aforesaid, moves over the graduated dial 50, may be provided with a sharp point 49' co-acting with the soft metal of which said dial is composed so that definite condenser settings may be permanently recorded by impressing this point into the metal of the dial, although this is not essential as the dial reading at a definite condenser setting may be noted and recorded.

In this form of instrument the only operating adjustment commonly applied in course of routine weight measurement is that performed by means of this arm 49 and once the instrument is calibrated, this operating adjustment consists in setting this arm at definite predetermined indented or recorded points found by the calibration to correspond with different standard samples of materials of determined thickness and composition that are to be matched. The purpose of these adjustments is to set the receiving circuit so that the indicating instrument 44 shall indicate a "null" point at the center of its scale when the particular material in question is being weighed if its weight is standard.

It sometimes happens that after the instrument has once been calibrated, changes occur due to wear of the parts, corrosion, or otherwise, so that a certain setting (which may be indicated by the indented points on the scale) do not correspond exactly with the "null" point of said instrument. Consequently it is desirable to provide means for effecting any slight corrections which may be necessary from time to time in order that the calibration may remain undisturbed. For this purpose I may employ the vernier condenser 46 connected in parallel with the variable condenser 45 and the condenser C and controlled by a knob 59 on the outside of the casing 48. Ordinarily said knob is not touched, but when it is necessary to correct small errors in calibration which may arise after the calibration has been once made, it may be manipulated sufficiently for that purpose.

In Figure 6 the substitution of the checking condenser 47 for the condenser 45 is effected automatically by means of the electromagnetically actuated switch 60, the circuit of which is controlled by the rider 61 which rests on the sheeted material and co-operates with the conducting plate 62 arranged below the material when no such material is present, thereby closing the circuit of the solenoid 63 through the battery 64, and causing said switch which normally bridges the plates 65, 66 to move to the right and bridge the plates 67, 68, thus cutting the condenser 45 out of circuit and the checking condenser into circuit. While in Figure 1 I have shown said rider 61 in the form of a metallic roller carried by the arm 69 which is pivotally connected to the bracket 70 attached to the frame and suitably insulated therefrom by the block 71, it will be understood by those skilled in the art that a variety of forms of gravity-actuated switches may be employed whereby as the web 24 passes from under the roller 61, or when there is no material between the plates of condenser C, the arm 69 will fall by its own weight and thereby close a circuit.

The conductors 72, 73 connected respectively to the rider and its cooperating plate are indicated in Figure 1 as connected to the casing 48 which will in such case enclose the switch 62 and its associated members. It is to be understood of course that the manual and the automatic substitution of the checking condenser for the variable condenser 45 may be used alternatively and that the apparatus may be provided with means for effecting such substitution manually, or means for effecting the same automatically, or with both such means, as desired.

In Figure 7 I have shown another arrangement for automatically substituting the checking condenser 47 for the variable condenser normally connected in parallel with the condenser C, the said arrangement having the advantage that said variable condenser is not cut out of circuit during the checking operation. In this figure the contact established between the rider 61 and its cooperating plate 62 when there is no material between the plates of the condenser C results in the energization of the electromagnet 74 and the actuation of the switch 75, it being understood of course that the circuit of said electro-magnet may be closed by any suitable switch when there is no material in condenser C, as when the web passes from under the rider and the latter falls by its own weight. Upon such closure of the circuit of the electromagnet 74 the switch 75 will connect the checking condenser 47 and the variable condenser 76 in multiple with the condenser 45 and the condenser C in a manner that will be obvious without further description.

In the present instance condensers 45 and 76 are both mounted on the same shaft 500 and the plates of the two condensers are placed in such angular relation that the movement of the arm 49 increases the capacity of condenser 76 by the same amount that it reduces the capacity of the condenser 45 or reversely, so that when both condensers are connected in parallel by the switch 75, the sum of their capacities will always be the same for every position of the arm 49.

Figure 8 represents one such arrangement that may be employed for this purpose, the common shaft of the two condensers being represented conventionally in Figure 7 as an insulation member connecting the rotors of the two condensers.

In the constructions represented conventionally in Figures 6 and 7 the relay is used instead of direct contacts to insure reliable dust-free contacts of negligible resistance in the condenser circuits. It is usually desirable to employ the automatic check since in that case whenever no material is being tested the check condenser is automatically so positioned as to show whether or not normality is present. But if for any reason this should be objectionable, the hand method and mechanism disclosed in Figures 4 and 5 may be employed. In the automatic method frequent verification of the normality of the apparatus is encouraged. Departures from normality would most commonly be due to dirt or adherent material sticking to the upper plate 29 of the condenser C. If the check shows any departure from "null" reading, dirt and other sources of error are looked for before recourse is had to the vernier condenser 46 as heretofore described. Further discussion of the use of this checking condenser will be given later.

While oscillatory exciting and receiving circuits and the coupling of the latter to the former may be made in any of several well known ways, the form that I have found most satisfactory where current is drawn from commercial power or lighting circuits is that disclosed in the application of Robert F. Field, Serial No. 227,694, filed October 21, 1927, for Oscillatory circuits and method of compensating for voltage changes impressed thereon, which discloses designs, connections and interrelation between the circuits adapted by selection of certain critical values to compensate for variations in the impressed voltage as wide as are likely to occur in any commercial circuits, such compensation being such that within close limits the indicating instrument will give, for any impressed voltage within the working range, the same reading for the same specimen in the condenser C. The exact design and proportioning of the circuits and coupling means therebetween which will adapt them to develop this tolerance of impressed voltage variation will be understood by reference to that application. If the voltage of the circuit feeding the instrument is closely maintained, any coupled oscillatory and receiving circuits of appropriate range will give accurate results.

In order that a clear understanding may be had with regard to certain constructions and arrangements herein illustrated, it is believed necessary to explain something of the adjustments of the circuits and the coupling between them and of the condenser which it is necessary to make. Certain of these adjustments will be made once for all before the machine leaves its place of manufacture and these will now be specified.

*1. The oscillatory exciting circuit*

An oscillatory circuit S suitable for a typical range of work is shown in Figure 4 and includes, by way of example, a seven and one-half watt tube 77 having a constant or variable grid leak 78 and fed from a 110 volt, 60 cycle, single-phase circuit 79 connected to the primary 80 of a transformer having a secondary 81 designed to impress 550 volts on the plate of the tube and a secondary 82 which develops a suitable voltage for the filament, the filament current being adjusted by the rheostat 83 and a voltmeter 84 being connected across the filament terminals. The usual feed-back coil 85 is employed adjustably coupled if the grid leak 78 is constant. Connected in series with the inductance 85' is an adjustable condenser 86, the primary 43 previously referred to, and the ammeter 87. Connected across said secondary 81 is a by-pass condenser 88 which may have a fixed capacity. A voltmeter 89 preferably is connected across the primary winding 80, and the casing 48 is arranged to house the three instruments 84, 87 and 89 as indicated in Figure 1.

A normal periodicity of 500 kilocycles is suitable for the purposes of the instrument itself, and gives a wave length of about 600 meters, which is not close to common broadcasting wave lengths. The periodicity or wave length adjustment will ordinarily be made at the normal impressed voltage and cycles. Of course I do not limit myself to the illustrative values given and in point of fact equally good results can be obtained by use of values widely different from these provided they are self-consistent.

*2. Receiving circuit*

The receiving circuit must be adjusted for (a) selectivity, (b) tuning, (c) amplitude of tuned response, (d) determination of scale, (e) calibration of deflections, (f) checking. These will be considered in that order:—

(a) Selectivity, breadth of range of wave lengths evoking response with a given setting, or "breadth of resonance curve". As is well understood, a receiving circuit of finite resistance and losses, tuned to exact resonance for a certain periodicity (say 500,000 cycles), gives a measurable response to periodicities very near this either above or below. As is also well known, low losses and low resistance determine a narrow range of periodicities to which the circuit gives measurable response while, at the same time, they increase the amplitude or strength of that response on the exact tuning point. Increase of losses and resistance with no change of coupling weaken the entire response without affecting much the range of susceptibility to wave lengths adjacent to the wave lengths for exact resonance.

If the coupling is changed so that the high-loss receiving circuit with the same tuning, gives the same resonant response as does the low loss circuit, then, as is well known, the high loss circuit will give measurable response to a broader range of periodicities or wave lengths than will that of lower losses. Otherwise stated, the slope of the resonance curve is steeper the lower the losses.

For different materials to be measured, and different conditions, the degree of sharpness of tuning or selectivity sought will differ, and this "steepness of the resonance curve" is determined by design to meet the conditions for which the instrument is to be used.

Figure 9 is a graph showing typical relations between tuning and response in a receiving circuit coupled to an oscillatory circuit generating a train of waves of constant periodicity, under conditions unchanged except by changes in the receiving circuit. For illustration a wave train of 500 kilocycles (six hundred meters wave length) is taken as emanating from the sending circuit, and the response of the receiving circuit is shown as a maximum when it is tuned to exact resonance with this frequency, and is shown to have progressively diminishing values as it is tuned to different frequencies on either side thereof. It will be seen that change of response is most nearly proportional to change of tuning,—and in this case to change of capacity,—over ranges indicated in the graph as roughly between 0.35 and 0.9 of maximum. It is desirable to have the common working ranges of the indicating instrument coincident with those tunings where this proportionality is most nearly approached.

By suitable initial design, particularly as to resistance and losses, and by corresponding coupling, the receiving circuit may be made to respond to a wider or a narrower range of waves, as shown in the dotted graph and that made with dashes, respectively, in Figure 9. These illustrate a comparison with the full line graph under the assumption that the coupling with the sending circuit is changed so that a fixed maximum response is obtained in the three cases.

(b) The second manufacturing adjustment of the receiving circuit is for tuning. As a factory process, this leads directly into adjustment of amplitude of tuned response, and thence into factory calibration.

Certain general factors will be considered before the actual process of tuning is taken up:—

Of the total capacity, only the part in condenser C is affected by the presence, weight and composition of the material to be measured, so, other things being equal, the larger the percentage of the total capacity which is in condenser C, the more sensitive will be the response to changes in the said material. On the other hand, of the total capacity, only that part in condenser 45 is adjustable to calibrate for different kinds of material passing through condenser C, so the more of the total capacity which is in condenser 45 the wider will be the range of adjustment available for measuring different materials.

Usually a given instrument will be designed to measure only a certain limited range of material such, for example, as the range of weights of inner tube rubber that may be made on one certain rubber calender to which that instrument will be attached. Commonly the weight-range that one instrument will be called upon to measure will not exceed a two-to-one ratio. Unless the range is likely to be extreme, as in some writing paper machines considered hereinafter as a special case, the capacity assigned to condenser 45 should be such that something near the whole graduated scale 50 will be used for the necessary capacity adjustment as between the heaviest and the lightest materials expected.

If the capacity in condenser 45 is much too large, so as to render the instrument available for a needlessly large range of weight, and if a simple direct-connected condenser adjustment be used as 49, 50, Figure 1, then only a fraction of the scale will be used for the actual range, and not only will the sensitiveness of condenser C suffer through unduly small percentage capacity thereto assigned, but also the calibration points for the actual range will be crowded together at one part of the scale 50 and it will be needlessly difficult to obtain the requisite fine calibrating adjustment of arm 49 on account of the rapid change of capacity due to a given movement of the said arm. On the other hand, if there is an insufficient part of the total capacity in condenser 45, the calibration points for extremes will run off-scale, and the instrument will not cover the desired range. This is a matter for calculation by the designer and requires only skill in the art of calculating high frequency oscillatory circuits, guided by such an understanding of specific requirements as this specification sets forth.

The condenser 45 may be so set up mechanically that as the arm 49 is swung to progressively higher numbers on graduated scale 50, more capacity will be progressively brought in, but if this is done, calibration points at the higher numbers on said scale will correspond to the lesser weights of measured materials, since heavier solid dielectric in C increases capacity of said condenser C, and requires compensation by decrease of capacity of swing-arm-controlled condenser 45. For this reason it is preferable to have progressively higher capacities of condenser 45 correspond to progressively lower numbers indicated by arm 31 on the graduated scale 50.

To effect the actual tuning, leading into calibration, suitable proportioning of parts being assumed, the following is the procedure, considering the method as essentially a null or zero method. Refinements for evaluating deflections are considered subsequently. First, the oscillatory circuit is energized at normal voltage and cycles, and sets up a train of electrical oscillations which may, for example, be assumed to be of a periodicity of 500 kilocycles, corresponding to a wave length of about 600 meters.

Second, by blocking up the rider or switch 61 or otherwise, the receiving circuit is set up with condenser C, 45 and vernier condenser 46 in parallel. A standard sample of the heaviest material expected is next put between the plates of condenser C thus giving maximum augmentation of its capacity, but maximum losses therein and hence in the receiving circuit R.

Third, with the coupling between oscillatory and receiving circuits roughly adjusted for a rather low mutual inductance, arm 49 is moved back and forth over scale 50 until, by trial and error, the resonance point is identified, through the deflection of instrument 44 at that point being higher than at points on either side of it. If the rough setting of the coupling has been too close, the indicator of the instrument 44 will go off-scale as resonance is closely approached, and if too loose, the maximum deflection will be small,—whereupon the coupling must be further adjusted until the maximum point corresponding to resonance is on a convenient,—preferably high—part of the scale, so that it can be accurately identified. By this procedure the instrument has been tuned to resonance with the heaviest sample in condenser C.

(c) The next factory adjustment is that of amplitude of tuned response of the secondary circuit:

With arm 49 remaining at resonance and other conditions unchanged, the coupling between the circuits is adjusted to a mutual induction that will determine a secondary or receiving-circuit current that will send the indicator of the instrument 44 barely off-scale. This fixes the amplitude or scale of responsive current in that circuit, with losses therein determined by the heaviest sample in condenser C.

It may be noted that with the same capacity (and therefore the same tuning), and the same coupling, obtained with any of the lighter samples inserted in condenser C, the correspondingly greater compensating air capacity in condenser 45 will result in lower circuit losses and in greater resonant response, (and the responses at other points of the resonance curve as well will be greater), so that, at resonance, under such conditions, the indicator will go farther off-scale than with the heaviest sample. This is the inherent response. Methods of keeping the resonance peak constant are disclosed later herein and are used if the different materials measured vary much in weight.

(d) The next factory adjustment is a factory calibration which consists essentially in determining how much of scale 50 is employed in conjunction with the circuits as set up, for recording the calibration points of materials covering the range for which this particular instrument is to be used. It may be noted that the procedure is exactly like that of calibrating the instrument by means of samples to be matched in actual service, except that the samples used are not samples to be matched, and therefore their calibration points may not be recorded by indentation or otherwise unless for purposes of future checking.

Starting this factory calibration with the instrument adjusted to resonance, with the heaviest sample in condenser C, and the meter 44 indicating a little off-scale at the high end, the arm 49 is moved toward less capacity (higher numbers) until the indicator of instrument 44 drops to exactly the "null" point, which is plainly marked and is usually either at mid-scale or else at 65% full-scale current point (see Figure 9). In section (e) on "calibration of deflections" the location of this "null" point with reference to the resonance curve and to the instrument scale is given extended consideration.

The arm 49 will now have been set by trial and error to a point giving null reading with the heaviest material in condenser C. This setting of arm 49 corresponding as it does to extreme heavy sample, should be near the low-capacity (high number) end of scale 500 in order that maximum use of the length of said scale may be realized. If it is not, the requisite correction is made by adjusting the tuning of the receiving circuit by change of the inductance of the secondary 42 therein contained, as for example, by changing the tap to which the circuit connection is made, this being represented conventionally by the adjustable contact maker 90 (Figures 4, 6 and 7). The corresponding change in capacity to put the circuit back where it was before, namely, to a point where the response will be indicated by a null reading on the instrument, determines the desired movements of the arm 49. A simple calculation would show the direction and roughly the amount of change in inductance required, but in this case a method of trial and error will be found very quick and easy if the design of the instrument is not initially far astray. If such a change of inductance is necessary, the instrument deflection at resonance will have to be checked over again and afterward the "null" reading re-established.

When the position of arm 49 on scale 500 for heaviest sample in condenser C is satisfactory, the coupling between the circuits is to be locked securely in place, taking care not to disturb its adjustment in so doing.

If future check of constancy of instrument conditions with the said standard heavy sample is to be made, the calibration point therefor will now be recorded in any suitable way, as for example, by strongly indenting the soft metal of scale 50 with the point on the arm 49 so that the initial setting just established may be exactly re-established in the future for said check; or merely by recording a numerical indication.

Next, with regard to factory calibrations for the lightest sample within the range of this particular instrument:—

With the coupling locked in the position determined in calibration for heaviest sample, the lightest is put into condenser C, and the arm 49 is swung toward more capacity until the instrument C again indicates exactly the "null" point. If the calculations of capacity 45 relative to the other constants of the circuit have been correct for this desired range of weight, then this setting of arm 49 will turn out to be near the low-number, high-capacity end of the scale 50; if it is not, the correction of design will consist in a change of the capacity 45. If the setting of the arm 49 is too far from the low-number end of the scale, then capacity 45 is too large—and conversely. If the capacity 45 has to be changed, then obviously both high and low settings will have to be made again. Ordinarily the designer's calculations will be found to have been sufficiently close, unless an instrument has to be adjusted to cover an empirical range of previously unknown samples.

It will be seen that in general these adjustments (a), (b), (c) and (d) are intended and adapted to insure that the design and adjustments of the instrument shall be such that, within the range of compensatory adjustment by condenser 45, there can be obtained for any material within the range to be measured, a tuning response that may be described as partway up the "resonance curve" at a point determining current corresponding to the null deflection of the instrument; and that the resonant response with any expected sample shall be such as to carry the pointer 44' of the instrument 44 to an indication somewhat off-scale but not excessively so.

Good results for "null method" operation can be obtained with nothing more than these simple adjustments but the results involving evaluation of deflections away from "null" reading require closer determination of the part of the resonance curve to be employed.

(e) The next factory adjustment is calibration of deflections.

So far the disclosure has treated the method of using this apparatus by a null or zero method, whereby the instrument 44 gives "null" indication as long as the commercial product continues to match the standard sample that was the basis of calibration, and deflects in the one or the other direction as a means of apprising the operator that the weight is high or low; so that he may make the necessary remedial adjustments. For many cases this is all that is required, and the simple calibrations described insure this much; but there are many products where it is important to know at least the approximate magnitude of the departure from standard, and the more precise method of calibrating and using the instrument so that it shall give such indications is next disclosed.

The first requirement is to design and adjust the circuits and the instrument 44 so that the working ranges of receiving-circuit tuning under the circumstances and conditions existing, shall coincide with the part of the "resonance curve" where small increments or decrements of tuning capacity in said circuit give rise to closely proportional responsive increments or decrements of receiving-circuit current and thus of instrument deflection. Under these conditions it is relatively simple to set up a calibration connecting and interpreting deflections away from the null reading in either direction.

Reference to the graph of a family of resonance curves in Figure 10 shows tuning response of a typical receiving circuit of my apparatus with constant coupling to an oscillatory circuit generating waves of 500 kilocycles, and with varying thicknesses of solid dielectric in condenser C, the abscissæ representing the frequency natural to the receiving circuit for varying values of capacity and the ordinates the response of said circuit to an impressed frequency of 500 kilocycles as its natural frequency is varied. This implies ordinates proportional to the square of current in the tuned receiving circuit. The instrument 44 adjusted as such instruments ordinarily are, will give deflection from its own zero (not the "null point") proportional to the ordinate, when the circuit is tuned to the frequency shown by the corresponding abscissa. As the thickness of the solid dielectric in condenser C, and hence the circuit losses, increase, the response of said circuit to the impressed frequency of 500 kilocycles is reduced and the resonance curves become less steep and more flat-topped.

It will be seen that the change in receiving-circuit current and hence instrument response is about proportional to the tuning change for instrument deflections between 35% and 90% of maximum, for a given resonance curve. For the lower instrument deflections proportionality is widely departed from and a large change in the tuning of the receiving circuit gives but a relatively small change of deflection.

For this reason I have found it desirable to adjust the instrument 44 with such initial tension in its spring, that its needle does not leave the low-end stop until the current is 35% of the full-scale current of the median resonance curve representing average material, and to set the circuit coupling with this instrument adjustment, so that resonance with average material shall give a deflection about 10% beyond the highest gradtiated point of the scale. This confines the instrument indications to the part of the resonance curve where its changes in deflection are nearly proportional to the changes in tuning that cause them.

Two other factors affect the relation between changes in receiving-circuit capacity in operation and instrument response thereto,—which is the relationship of primary interests.

First: Circuit losses vary with the changes in thickness of material that causes the said capacity changes, so the relation of tuning to response is not depicted by a portion of any one of the family of curves of Figure 10 since the point depicting said relationship passes from one of these resonance curves to another as the losses change. This is shown on a magnified scale in Figure 11.

Second: Periodicity varies as the reciprocal of the square root of inductance times capacity. Over the selected fraction of the resonance curve, the change of position of the pointer of the instrument 44 is very nearly inversely proportional to the increment (positive or negative) of the periodicity, determined by capacity change. Hence through this limited range it is very nearly true that increments of instrument deflection vary directly with simultaneous increments of square root of total capacity. But the increments or decrements of weight met with in a given moving web are such as to determine but very small changes of total circuit capacity—rarely 1% and over these ranges the changes in values of a square-root function can be very closely represented by a straight line graph. From these considerations it appears that a straight line may be expected to express a good approximation to the graphic plot best expressing relation between changes of capacity (and hence of weight of the moving web) and the resulting instrument deflection, and I have justification for using straight-line plots in the calibration-graphs referred to immediately hereafter.

For the actual evaluation of instrument deflections above and below "null" in terms of departures of weight from normal the following empirical calibration procedure is followed:—

The purpose is to determine a constant for converting instrumental deviations to weight corrections applying to a specific material. For common materials this constant can be determined by the maker of the instrument at his premises by use of standard weight-ranges of samples of such standard materials. In some other cases it can best be determined at the place of use. In either case the procedure is the same.

Where great accuracy is required, groups of specimens ranging above and below several standard weights are used as the basis of the measurements. Commonly as much precision as is required can be had from measurement of a single group ranging above and below a specimen of about average weight. Consider a case where calibrating readings are made on two groups of standard samples of considerably different weights.

With condensers C, 45, 46 in parallel in the receiving circuit, a standard heavy sample is put in condenser C and condenser 45 is adjusted by arm 49 until exactly a null reading is obtained on instrument 44. The arm 49 is left at exactly that setting during the rest of the heavy-sample determination.

Next are substituted, one after the other, several specimens of the same material heavier and lighter than the standard by amounts covering somewhat more than the expected range of variation for that material and nominal weight, and in each case the deviation of instrument 44 expressed in divisions above or below null reading, is recorded against the known excess or deficiency of weight per unit area of the specimen.

The best way to compute the desired conversion factor from these observations is to plot the several values on rectangular section paper with instrument-deviations as ordinates and corresponding weight-deviations as abscissæ, and to draw through these points a light straight line best representing them, as in Figure 12. The tangent of the slope of this line gives the desired conversion factor for multiplying into divisions of instrument deviation to obtain weight deviation per unit of area.

The process is repeated at and about the lighter specimen, arm 49 being changed to give "null" when the specimen is as per sample. The results there will usually plot as a straight line of very slightly different slope,—the smaller percentage capacity in C tending to make it steeper, and the lower circuit losses tending to make it less steep, as compared with the graph from the heavy sample.

Finally a mean line is drawn, shown as the heavy line in Figure 11, best representing the whole calibration; and its tangent is marked for convenience on the graph as the conversion factor, as for example: "inner tube stock 45A. Each scale division corresponds to 1.21 ounces per square yard."

Any two materials of the same dielectric constant and of approximately the same weight will give the same conversion factor for the same circuit conditions (e. g., the same coupling), and in any given industry there will be many materials of substantially the same dielectric constant. Where all the materials to be run on one machine will have the same conversion constant and coupling is not subject to change it may be desirable to calibrate the instrument scale at the factory in direct-reading divisions, so that the excess or deficiency of weight can be determined without computation.

Where composite standard sheets consisting of a plurality of materials having different dielectric constants are used for standards and excess and deficiency sheets,— usually at the place of use,—care must be taken that the excesses and deficiencies are due to the same controllable causes that may in fact bring about such differences during manufacture—for example where the sample is tire fabric "frictioned" or impregnated with rubber, the calendering operation cannot control the weight of the fabric, and does control only the rubber, therefore the differences between the heavy and light samples should be due to differences only in weight of rubber of the same composition for all specimens.

(f) The final factory adjustment is that adapting the instrument to receive periodical "air-checks"—that is, checks of normality of circuits, parts and adjustments when the condenser C is on air dielectric only. The procedure is as follows:

With air only in the gap of condenser C the rider or switch is allowed to fall to its natural position thus energizing the circuit-changing relay 63 which throws condenser 45 out of circuit and substitutes therefor condenser 47 in parallel with condenser C, (as shown in Figure 5, this may be done manually). Next, condenser 47 is adjusted by a key entering the case until the pointer of instrument 44 reads on "N" at the middle of the scale. The condenser 47 is then fastened by means of a set screw (not shown) and the keyhole preferably sealed, so that it can not be moved easily or accidentally. The purpose of this adjustment is to establish a basis for checks from time to time, during the process of operation.

If, at any subsequent time, the condenser 47 is switched into parallel connection with condenser C with air dielectric only in place of condenser 45 the pointer of instrument 44 should return to the null point "N" at the middle of the scale. If the pointer does not return to "N" it indicates that something has gone out of adjustment, and the cause must be discovered and corrected before the readings of the instrument can be accepted. The trouble may be dirt on the plates of condenser C, loosening or wear of limiting stops of said condenser, grounded material near the leads therefrom causing development of appreciable lead capacity, breakages, injuries or short-circuiting in any of the circuits, impressed voltage or cycles off normal by an amount greater than the compensating circuit can correct for, or the like.

It must be borne in mind that the adjustment of the gap of condenser C must be precise within very small limits. The restoration of this gap if once the adjustment is lost requires the use of gauges of great exactness and the exercise of the skill of a highly trained mechanic.

The small vernier condenser 46 operated by knob 59 is connected in the receiving circuit at all times. It remains untouched during both factory adjustments of working circuits and condensers, and factory adjustments of parts for "air-check", and during both is left in its normal adjustment at a constant setting at about the middle of its capacity. As pointed out before the small remedial changes of capacity of receiving circuit that this vernier condenser can make, affect that circuit equally under working and check conditions. If on air-check the indicator does not quite return to null, and no remedial cause can be found, it is therefore permissible,—and is correct procedure—to make the necessary small adjustment with this condenser 46. Repeated comparisons of conditions with air-check and check of previously established calibration points with solid dielectric in C show that the same remedial adjustment of condenser 46 that brings the aircheck reading back to null, also brings the solid dielectric reading back to null. This would be expected since, except for the small correction due to difference of circuit losses, the circuit conditions are the same in both cases. This vernier condenser which is an important factor in maintaining commercial operation, is not proportioned nor intended to remedy large departures of null reading, but only those minute departures that are found unavoidable.

The exciting and receiving circuits are surrounded by a metallic case 48 which has the two-fold function of protecting them from dirt and injury and also of minimizing broadcasting. The receiving circuit must be given its final tuning and the air-check condenser 47 must be adjusted with this case in place, since the resonant period of the circuit is slightly affected thereby. Appropriate key-operated members and key-holes in the case are provided so that this final adjustment can be made by a key from outside and the keyholes afterwards closed as with sealing wax plugs or in any other suitable manner.

It will be seen from Figures 4 and 5 that when the instrument is in working relation with the material to be measured, the capacity in the receiving circuit thereof consists of the following fractional parts connected in parallel with each other: The capacity of condenser C, augmented beyond its air capacity by the presence of the material 24 between its plates, the capacity of tuning condenser 45 adjusted to a calibration point suited to this particular material by arm 49 and vernier condenser 46 constituting a small tuning adjustment common to the working and the check connections.

As above set forth, the capacity in the receiving circuit under conditions of check consists of the following fractional elements connected in parallel: Condenser C with air only between the plates, condenser 47 adjusted once for all and vernier condenser 46 in its median position, said condensers 47 and 46 having a capacity which, added to air capacity of C, will determine a definite "null" mid-scale deflection of instrument 44. However, the condenser 45 is not included (or at most an edge effect which is constant) at the time that this checking connection is established, and therefore any change therein, such as that caused by dirt between the plates thereof, will not be checked. In the modification shown in Figures 7 and 8, said condenser 45 remains in circuit during the checking operation, for which the connection is as follows: When the circuit is changed from operating to checking connections condenser 76 is thrown into parallel with the other condensers 45, 46, 47 and C and nothing is thrown out. Condenser 45 plus condenser 76 in parallel therewith will have the same capacity at whatever setting; therefore it is possible to select a capacity for condenser 47 (representing, in fact, the minimum augmentation of capacity of C due to solid dielectric between its plates when said dielectric is the thinnest that will be measured) such that the capacity of condenser C with air between its plates and the capacities of condensers 45, 46, 47 and 76 shall always give a mid-scale (N) deflection of the instrument 44.

Otherwise defining the capacities involved: 47 added in parallel to 76 for any given setting of arm 49 will always equal the augmentation of capacity of C due to the normal solid dielectric between the plates thereof for the said setting of said arm.

The advantage of this connection and method of operation lies in the fact that at the time of check all of the parts of the circuit that were included on working connection are still included, the change being the addition of condenser 76 instead of the subtraction of condenser 45. Thus any error, change or maladjustment in any part of the circuit or apparatus will be reflected by a change in the reading of instrument 44.

Referring to the increase of capacity of C due to solid dielectric (material to be weighed) between its plates as "augmentation" it will be seen that upon changing from working connection to checking connection in the system shown in Figures 7 and 8 there is substituted for the augmentation of capacity C two capacities, namely, the fixed capacity 47 representing augmentation due to minimum solid dielectric likely to be measured; and the variable capacity 76 representing the calibrated value of the added augmentation over and above this minimum, due to excess weight beyond minimum in the sheet at C corresponding to the said calibration point.

This completes the factory adjustments and operations.

The working calibration of the instrument is in practically all respects the same as the factory calibration hereinbefore described, and a very brief reference to it will be sufficient to make the matter clear.

As in the factory calibration, a standard sample of the material to be matched is put between the plates of condenser C. Care is taken to see that the switch 61 or the equivalent manually-operated switch 51 determines the working and not the air-check connections. The arm 49 is then swung over the graduated scale 50, thus adjusting the capacity of condenser 45 until such degree of tuning is reached that the pointer of instrument 44 reads exactly null,—whereupon the sharp point of arm 49 is impressed upon the soft metal of the graduated dial 50 leaving an indentation that can be recognized readily by feeling when the arm is again passed lightly over the appropriate part of the dial. This establishes the calibration for the material in question, and the nearest visible graduation is recorded on the standard sample, and in a calibration book against said material, as a convenient means of finding and identifying the more exact indentation. With this setting of arm 49 material of the standard composition and weight of the said sample will thereafter always deflect the instrument 44 to the "N" point at the middle of the scale, and if the deflection differs from this, it will be known that the material currently running differs from standard either in composition or in weight. As explained later herein a particularly accurate form of reading indicator may be substituted for the point and dial, and is better in some circumstances hereinafter pointed out.

It will, of course, be understood that as many calibration settings for arm 49 will be established as there are varieties of material to be run over this instrument.

The standard sheets representing material to be matched should be filed in an orderly manner, since they may be required in the future for purposes of check. It may happen that the material is such that such a standard sheet cannot be long preserved without loss by volatility or the like, as in case of celluloid, or of materials normally carrying moisture, as "cellophane". In such cases a secondary standard may be made of a more permanent material such as hard rubber, bakelite or the like, found by experiment to determine exactly the same behavior of the instrument as the sample to be matched. This may be marked and kept as a standard for future use in checking. In making such secondary standards it is convenient to start with a hard rubber or similar sheet a little too thick, and drill out material near the middle portion covered by the condenser C until the reading is exactly the same as that from the primary sample to be matched.

It may be noted that all the indications of the instrument are given on the low-capacity, high periodicity side of the resonance curve (the right hand side as in Figs. 9 and 10) that is, the side where the introduction of more capacity will reduce the periodicity and increase the approximation to resonant response to the wave-train being received. This is not only for the obvious but trivial reason that it is a natural arrangement, wherein increase of weight of the sample increases the current through the instrument rather than decreasing it, but for the more weighty one that the arrangement of circuits disclosed in the application of Robert F. Field above referred to it adapted to give very much better tolerance of variations of impressed voltage when the low-capacity side of the resonance curve is used.

The measurement of a traveling web of paper presents the same generic problem as that of a traveling web of rubber, of cloth impregnated with rubber, or oilcloth or the like, but specific requirements and the particular characteristics of paper determine a technique different from that just described in several important particulars involving some differences in the construction of the apparatus and the methods of its operation. A preferred construction and method for the measurement of the weight of traveling web of writing paper will next be specified since the conditions presented by writing paper are more exacting than those presented by most other grades.

It will become apparent after the form of apparatus best adapted to the measurement of paper has been described, that the instrument disclosed for that purpose would be adaptable to the less severely exacting conditions of, say, the rubber industry, and that the reason for not so using it lies in its somewhat lesser degree of structural simplicity. It will be possible for those familiar with any given art or condition to which either form of this instrument applies, to choose the form best adapted to his particular requirements.

Considering the measurement of the weight of the range of traveling webs of writing paper likely to be made on any given single paper machine and to be weighed thereon by the same instruments with no more than changes of adjustment the following are the specific factors:—

(a) The weight per unit area (ream weight) may commonly vary from a given value to five times that value, and occasionally within wider limits.

(b) The paper substance will differ as between one and another quality, but the dielectric constant thereof will not change much on that account for the reason that the variable or alternative materials entering into writing paper do not differ very much in this respect.

(c) Moisture should be kept constant at a normal value—say 6%—and it is better to read the weight of the normally-moist paper than to compensate so as to read bone dry. This is because either bone-dry paper or over-wet paper changes its moisture content rapidly in storage and thus changes weight after the weight determination here specified has been made, while paper of normal moisture content remains about constant.

(d) Periodical samples of the current product have to be taken by "tear-out" even if weight and moisture are currently determined, since formation and finish have to be checked by inspection of these. Thus current samples are available for occasional balance-weight verification of the instrument and method here specified.

As in the case of other materials previously considered, the primary purpose of the continuous weight indication in paper making is to give the operator of the paper machine a guide in keeping the weight at the normal specified point, and in bringing it back to that point if it wanders. Therefore for practical purposes the instrument must be correct at the normal (N) reading and need have only reasonable precision in translating into terms of weight, the departure of the indicator from normal (N).

For paper other than writing paper, made on suitable paper machines, all of these statements apply except that in some cases there is but little variation of weight—e. g. in newsprint.

The difficulties in using on paper under the conditions specified, the exact type of instrument described as suitable for rubber, lie principally in three factors:

First, if condenser C has enough capacity so that, by its various settings alone, it can compensate for the whole wide scale of differences between the weights of paper likely to be encountered, then its capacity will be so large that very small movements of the arm 49 will effect such large changes of capacity that fine adjustment by means of this arm will be difficult.

Second, the weight of material between plates of condenser C may differ so widely on one given paper machine at different times, that it is no longer approximately true that the capacity of condenser 45 at the corresponding setting, adds up to the same actual electrostatic capacity as that of the air condensers under "air-check" conditions—namely, condenser C with air, plus condenser 46. That simple relation is always complicated somewhat by the following correction factor already discussed. If condenser C with material in the gap, and condenser 45 with air, were set to exactly the same electrostatic capacity for two different weights of the said material, it would not be found that the "N" indication of instrument 44 would be exactly the same for the two cases, because, we should have in the one case a circuit with the same reactance and capacity as in the other, but with higher losses; and in consequence we should have in the one case a flatter tuning curve (Figs. 9 and 10) corresponding to a smaller maximum deflection at exact resonance and thus a smaller deflection at the half-way-down point, N.

By adjusting the capacity in the one case and the other to different values, and thus changing the tuning so that the maximum or resonant response corresponds to different wave lengths in the two cases, the mid-scale (N) response can be adjusted so that the one is greater or less than, or the same as, the other. The calibration is at N, and insures coincidence at N, but does not insure the same electrostatic capacity in the two cases.

With differences of capacity in condenser C no greater than are encountered under ordinary circumstances between sample and sample on a single rubber calendar, the necessary changes of capacity and tuning to keep this "N" indication measurably the same are not so great as to preclude satisfactory work with a coupling correct for average conditions.

Otherwise stated, when the amount of material between the plates of condenser C does not differ very much from sample to sample, as for example, in weighing rubber produced on one given rubber calendar, the coupling can be adjusted once for all to give maximum or resonant deflection far enough off scale with the thinnest sheet likely to be encountered so that with the thickest, the maximum deflection will still be off-scale by a sufficient amount to bring "N" at a proper working part of the tuning range. In that case the empirical setting of condenser 45 by arm 49 to a capacity giving mid-scale deflection "N" with any sample in the weight range between plates of condenser C, will still leave the working readings on such a part of the "tuning curve" (see Fig. 11) as to insure satisfactory operation of the instrument.

On the other hand, with such large differences in weight of webs passing between plates of condenser C as are found in the measurement of the different weights of writing paper likely to be made on the same paper machine, it will ordinarily be necessary to change the coupling, and consequently the whole scale or magnitude of the response in order to weigh all papers presented, because otherwise the change in receiving-circuit condenser loss may be so much that with any proper setting for the thinnest paper, the resonant deflection will not go off-scale when the thickest paper between the plates of condenser C determines the highest receiving-condenser losses and consequently the flattest curve.

There are two available ways of changing coupling hereinafter disclosed. It is not practicable to make such change by trial and error at the paper-mill, and neither of the said methods requires this. The one that will be described first employs an apparatus wherein the coupling is adapted to be set at a plurality of points, each capable of accurate reinstatement, and each adapted to use in the measurment of papers embraced within a certain range of weights. The other construction and method, subsequently described, is one wherein the adjustment of condenser 45 to reestablish the null reading for a given weight of paper in itself adjusts the coupling to a value exactly or approximately adapted to that weight of that material.

With the construction and method first named, the coupling is set in initial factory adjustment at one determinate point capable of accurate reinstatement, and permanently correlated with a certain step of condenser setting, for papers from the lightest up to a predetermined weight. For the next ensuing range of thicknesses a second definitely determinate point may be provided and used, and possibly for still higher ranges, a third. It will be understood that more than three points may be used, but in ordinary writing-paper ranges they are not usually required.

These changes in coupling, when made, are not in the nature of progressive empirical calibration settings to bring about by trial and error a certain reading under certain conditions. On the contrary, the coupling is set in initial factory adjustment at one determinate point for papers between stated thicknesses, the same point being capable of accurate reinstatement. For the next ensuing range of thicknesses a second definitely determinate point is used, and possibly for still higher ranges a third. It will be understood that more than three points may be used but in ordinary writing paper ranges they are not usually required.

The validity of the various calibration points on settings of arm 49 is conditioned upon the coupling being set to correspond with the weight of the paper being run, the calibration on the particular weight having been initially made with that coupling. Therefore the adjustment must be of a sort minimizing liability to mistakes, as for example, of the sort shown in Figs. 14 and 15 hereinafter described.

It is desirable to have a part of the adjusting condenser 45, shown as integral in Figs. 4, 5, 6, 7 and 8, arranged separately, to be thrown in by steps when the couplings are changed, preferably by the same controlling means, so that the part controlled by the swinging arm shall not be of capacity so great that fine adjustment is difficult.

This may conveniently be accomplished by connecting several of the stator plates of condenser 45 to the contact points 91, 92, 93 and arranging on the shaft 94 whereby the coupling between the primary 43 and secondary 42 is changed, a contact maker 95 co-operating with said contact points so that as the coupling is changed the capacity of said condenser is varied.

In the present instance the shaft 94 carries a worm 96 meshing with the gear 97 carried by the shaft 98 on which said primary is mounted.

When the weight of the paper in the condenser C increases to such a degree as to produce a given loss in the receiving circuit and consequently a resonance curve with resonant response and entire scale too low, and it becomes necessary therefore to increase the coupling between 42, 43 by rotating the shaft 94 by means of the knob 99 or otherwise, the capacity of the condenser 45 is correspondingly and simultaneously reduced, thus leaving the same null point a relatively lower point on a higher curve. As above stated, that portion of the capacity of said condenser controlled by the arm 49 need not with this arrangement be so great as to render the fine adjustment thereof difficult.

Preferably the contact maker 95 is provided with a projection 100 which takes into a depression on each of the contact points 91, 92, 93 so as to definitely determine the position of the shaft 44 and hence the degree of coupling for each variation of the capacity of condenser 45.

Figure 16 illustrates means whereby the change in capacity with change in coupling may be made progressively instead of by steps. In this figure the rotor of condenser 45 is mounted on the shaft 101 carrying the gear wheel 102 which meshes with the pinion 103 on the shaft 104, the latter being rotatable by the head 105, and the arrangement being such that a number of revolutions of said shaft 104, for example, 20, will effect a complete revolution of the shaft 101. Means are provided for indicating the number of revolutions of the shaft 104, such means being represented in the present instance as the counter 106 actuated by a pin 107 which cooperates with a sprocket 108 carried by the shaft of said counter.

The figures on the counter cylinder appear below the window 109 in the cabinet 48 and a dial 110 is arranged to rotate with the shaft 104, so that the revolutions and fractions thereof of the shaft 104 may readily be determined and the setting of the condenser 45 which brings the indicator of the instrument 44 to null position readily ascertained.

It will be understood of course that the reading of said counter and dial replaces the reading of the scale 50 in that embodiment of my invention shown in Figure 2.

The shaft 98 carrying the coupling coil 43 is operatively connected in any suitable manner to the shaft 101 so that the angular position of said coil 43 with respect to the coil 42 will be varied for every setting of the condenser 45. In the present instance the bevel gears 111 are shown as connecting said shafts.

By means of the construction shown in Figure 16, the coupling between the exciting and receiving circuits is altered progressively or continuously with changes in the capacity of the condenser 45 in order to compensate for variations in electrical losses due to differences in weight and/or grade of the material to be tested.

By means of the apparatus shown diagrammatically in Figure 17, means are provided for automatically compensating for dielectric losses due to differences in weight and/or grade of the material to be tested. This is accomplished by varying the coupling between the exciting and receiving circuits automatically and simultaneously with the adjustment of the variable condenser 45 to give the receiving circuit with any standard sample of material in condenser C within the range contemplated substantially the same resonant or maximum current and thus response of instrument 44 as with any other such standard sample within the said range. Thus when with a very heavy sample the part of total circuit capacity due to high-loss solid-dielectric capacity is much augmented, the strength of the coupling—in this case a capacity coupling—is just sufficiently augmented to make up for the augmented losses, and to give the desired resonant current,—for example, one carrying the instrument pointer 44′ say 10% in terms of current indication beyond the last marked division of the scale. Again, when the sample in C is very light, so that the part of total pick-up circuit capacity due to high-loss solid-dielectric capacity is relatively small, the coupling is just enough diminished in strength or mutual capacity effect to make up for the diminished losses, and to give the same resonant current as before. And similarly with intermediate weights of solid dielectric in condenser C,— in each case the strength of the coupling will be adjusted, by the mere act of adjusting condenser 45 for resonant point, to a strength such that the current at resonance will be the same as in either of the extreme cases. This will be seen to be the same object sought by the construction shown in Figure 16; in the case here discussed the means of coupling the pick-up or secondary circuit to the primary differs from that shown in Figure 16 and indicated in Figures 4 and 6, in that here the coupling is through the capacity 114 and adjusting capacity 115 shown in Fig. 17 instead of through inductance 43—42 of Figures 4 and 6.

The use of a capacitative instead of an inductive coupling has a substantial real advantage where adjustment is made as it is here, in that there are neither moving leads nor rubbing contacts, either of which is liable to introduce variable errors when movement takes place.

In Figure 17, S′ is an exciting oscillatory circuit similar in its essential features with the circuit S shown in Figure 4, except that the terminals of the filament circuit are grounded as indicated at G and the plate circuit instead of being connected by a lead to the filament circuit is grounded, as indicated, and includes a radio frequency choke 112 and a blocking condenser 113, which perform the usual functions of confining the high frequency and low frequency currents to their proper circuits. A blocking condenser 123 may be connected between the plate of the tube 77 and the inductance 85′. While with this arrangement there is a small leakage current flow through the thermoammeter 44, this is constant and is so small in amount as to be negligible.

The receiving circuit R′ conforms in general to the corresponding circuit R of Figure 4, except that various elements thereof are grounded, as indicated at G, instead of being connected together by leads. It will be understood of course that the "ground" G indicates a conductive connection to the metallic casing 48.

The said receiving circuit R′ is capacitively coupled to the exciting circuit S′ by the condenser 114, one terminal of which is directly connected to one end of the inductance 42, and the other to a point on the inductance 85′ intermediate the ends thereof.

It will be readily understood that the high frequency oscillations developed in the circuit 85′, 86, 87, G, will be transmitted to the receiving circuit R′ by the capacity coupling above mentioned.

Shunting the condenser 114 is a vernier condenser 115, the movable plates of which are mounted on the shaft 116 which carries the movable plates of the variable condenser 45.

As shown in Figure 18 the shaft 116 is made in two parts coupled by an insulating sleeve 117 both sides of the condenser 115 being live. This condenser 115 may comprise a fixed plate 120 carried by a bracket 121 of insulating material, and a plate 123 rotatable with the shaft 116. The plate 123 is shown as adjustable toward and from the plate 120 and angularly related thereto. For this purpose the shaft 116 is provided with a fine thread, the plate 123 being fixed to one end of a sleeve 124 correspondingly internally threaded. The opposite end portion of the sleeve 124 is externally tapered and threaded and slotted inwardly to form spring jaws. These may be pressed inwardly to clamp the sleeve on the shaft 116 by a nut 125 engaging thereon.

As already explained, differences in grade of the material to be tested, for example, paper, will vary the dielectric losses in the condenser C and thereby change the resonant response of the receiving circuit and also the shape and slope of the resonant curve, and, specifically, the greater the solid dielectric of the condenser C, the greater the dielectric loss. To compensate for such differences in dielectric loss resulting from differences in grade of the material to be tested, the coupling between the two circuits is progressively varied by the vernier condenser 115 having its rotor or movable element mounted on the same shaft as the rotor or movable element of the variable condenser 45, as aforesaid, and such variation is simultaneous with the adjustment of said condenser 45. For example, if a standard sample of a very heavy grade of paper is placed between the plates of the condenser C, the capacity of the condenser 45 is reduced to give the circuit a predetermined frequency and bring the indicator of the instrument 44 to its null position, and at the same time the capacity of the vernier condenser 115 is automatically increased to augment the coupling between the two circuits so that the current at the resonant point of the receiving circuit as shown by instrument 44 with said sample associated with said condenser C is the same, or approximately the same, as it would be were a sample of lighter paper placed in said condenser, as hereinbefore explained, generally, in connection with Figure 9.

The design and adjustment of the vernier coupling condenser 115 on the shaft of the main secondary adjusting condenser 45 is such as to hold the current and thus the deflection of instrument 44 at the resonance point as near to a constant value as possible through the desired working range on material of the dielectric losses that it is intended to weigh or test. The relation of the plates of this vernier condenser is adjustable both angularly and as to distance apart, and a good approximation to a constant resonance deflection can be obtained. Once the instrument is calibrated, these adjustments will have to be locked, since they affect the calibration profoundly.

Of course the motion that reduces the capacity of the adjusting condenser 45 increases the capacity of the condenser 115 and hence the coupling. The reason is clear; the more of the total secondary capacity which is air capacity and the less which is solid-dielectric capacity, the higher the peak of the resonance curve, other things equal—so when some of this adjusting air-capacity 45 is taken out to make up for increased solid-dielectric capacity in C, the coupling has to be correspondingly increased if the resonance peak is to be kept at unchanged value.

This variable condenser 115 in connection with the capacity coupling condenser 114 accomplishes the same result sought to be obtained by varying the coupling as shown in Figure 16 but has the great advantage thereover that it does not require movable leads.

Having thus described certain embodiments of this invention, it should be understood that various changes and modifications might be made therein and that the invention may be embodied in various other forms and practised in other ways without departing from the spirit or scope of the invention as defined by the appended claims.

I claim:

1. Apparatus for determining a characteristic of a material comprising in combination an oscillatory electric circuit including a condenser, means for so relating a portion of the material to be tested to said condenser as to vary the frequency of said circuit, a variable condenser connected in parallel to the first mentioned condenser, means responsive to the value of said electrical property for indicating the value of said characteristic, a checking condenser, and means for connecting said checking condenser in parallel to the first mentioned condenser when the capacity of said variable condenser is substantially zero.

2. Apparatus for determining a characteristic of a material comprising in combination an oscillatory electric circuit including a condenser, means for so relating a portion of the material to be tested to said condenser as to vary the frequency of said circuit, a variable condenser connected in parallel to the first mentioned condenser, means responsive to the value of said electrical property for indicating the value of said characteristic, a checking condenser, and means for automatically disconnecting said variable condenser from said circuit and simultaneously connecting said checking condenser in parallel to said first mentioned condenser.

3. Apparatus for determining a characteristic of a material comprising in combination an oscillatory electric circuit, means for so relating a portion of the material to be tested to said circuit as to vary the frequency thereof, variable means for giving said circuit a predetermined frequency corresponding to the known value of the same characteristic of a standard sample of said material when said sample is related to said circuit, means responsive to the value of said electrical property for indicating the value of said characteristic, a checking device, and means automatically connecting said checking device with said circuit upon the disassociation of said variable means from said circuit.

4. Apparatus for determining a characteristic of a material comprising in combination an oscillatory electric circuit, means for so relating a portion of the material to be tested to said circuit to vary the frequency thereof, variable means for giving said circuit a predetermined frequency corresponding to the known value of the same characteristic of a standard sample of said material when said sample is related to said circuit, means responsive to the value of said electrical property for indicating the value of said characteristic, and automatically operative means for giving said circuit said predetermined frequency when neither said sample nor the material to be tested is related to said circuit.

5. Apparatus for determining a characteristic of a material comprising an oscillatory electric circuit, means for so relating a portion of the material to be tested to said circuit as to vary the frequency thereof, variable means for giving said circuit a predetermined frequency corresponding to a known value of said characteristic of a standard sample of said material when said sample is related to said circuit, means responsive to the value of said electrical property for indicating the value of said characteristic, a checking device, electromagnetic means for disconnecting said variable means from said circuit and simultaneously connecting said checking device to said circuit, and a gravity-actuated switch for controlling said electromagnetic means.

6. Apparatus for determining a characteristic of a material comprising in combination an oscillatory electric circuit including a condenser, means for so relating a portion of the material to be tested to said condenser as to vary the frequency of said circuit, a variable condenser connected in parallel to the first mentioned condenser, means responsive to the value of said electrical property for indicating the value of said characteristic, a checking condenser, electromagnetic means for disconnecting said variable condenser from said circuit and simultaneously connecting said checking condenser in parallel to the first mentioned condenser, and a gravity-actuated switch for controlling said electromagnetic means.

7. An apparatus for determining a characteristic of a material comprising in combination an oscillatory circuit including a condenser constructed and arranged to permit the material to be tested to be associated therewith in such manner as to vary the capacity of said condenser and the frequency of said circuit, a variable condenser electrically associated with said circuit for giving the same a predetermined frequency when a standard sample of said material is associated with the first mentioned condenser, means responsive to the value of said electrical property for indicating the value of said characteristic, a checking condenser and means for electrically associating said checking condenser with said circuit when the capacity of said variable condenser is substantially zero, said checking condenser having such capacity as to give said circuit said predetermined frequency when the capacity of said variable condenser is substantially zero and neither said sample nor the material to be tested is associated with the condenser first mentioned.

8. An apparatus for determining a characteristic of a material comprising in combination an oscillatory circuit including a condenser constructed and arranged to permit the material to be tested to be associated therewith in such manner as to vary the capacity of said condenser and the frequency of said circuit, a variable condenser electrically associated with said circuit for giving the same a predetermined frequency when a standard sample of said material is associated with the first mentioned condenser, means responsive to the value of said electrical property for indicating the value of said characteristic, a checking condenser and means for simultaneously disconnecting said variable condenser from said circuit and electrically associating said checking condenser therewith, said checking condenser having a capacity as to give said circuit said predetermined frequency when said variable is disconnected from said circuit and neither said sample nor the material to be tested is associated with the condenser first mentioned.

9. An apparatus for determining a characteristic of a material comprising in combination an oscillatory circuit including a condenser constructed and arranged to permit the material to be tested to be associated therewith in such manner as to vary the capacity of said condenser and the frequency of said circuit, a variable condenser and a vernier condenser both connected in parallel to the condenser first mentioned, the capacity of said condensers when a standard sample of said material is associated with the first mentioned condenser determining a definite frequency of said circuit, means responsive to the value of said electrical property for indicating the value of said characteristic, a checking condenser constructed and arranged to be associated with said circuit when said variable condenser is inoperative to affect the frequency of said circuit and when neither said sample nor the material to be tested is associated with the first mentioned condenser, the capacity of said checking condenser, together with the capacities of the vernier condenser and the first mentioned condenser, giving said circuit said definite frequency when neither said sample nor the material to be tested is associated with the condenser first mentioned.

10. Apparatus for determining a characteristic of a material comprising in combination an oscillatory electric circuit including a condenser, means for so relating a portion of the material to be tested to said condenser as to augment the capacity of said condenser and thereby reduce the frequency of said circuit, means responsive to the value of said electrical property for indicating the value of said characteristic, a variable condenser connected in parallel with the first mentioned condenser for decreasing the frequency of said circuit to a predetermined value, a checking condenser, and means for connecting said checking condenser in parallel to the first mentioned condenser, the capacities of said variable condenser and said checking condenser together being equal to the augmentation of the capacity of the first mentioned condenser due to the association with the first mentioned condenser of the material to be tested.

11. Apparatus for determining the characteristic of a material comprising in combination an oscillatory exciting circuit, an oscillatory receiving circuit electrically coupled thereto, means for so relating a portion of the material to be tested to said receiving circuit as to vary the frequency thereof, variable means for giving said receiving circuit a predetermined frequency corresponding to the known value of said characteristic of a standard sample of said material when said sample is related to said circuit, and unitary means for altering a property of said variable means and simultaneously therewith varying the coupling between said circuit.

12. Apparatus for determining the characteristic of a material comprising in combination an oscillatory exciting circuit, an oscillatory receiving circuit electrically coupled thereto and including a condenser, means for so relating a portion of the material to be tested to said condenser as to vary the frequency of said receiving circuit, variable means for giving said receiving circuit a predetermined frequency corresponding to the known valve of said characteristic of a standard sample of said material when said sample is related to said condenser, and unitary means for altering a property of said variable means and simultaneously therewith varying the coupling between said circuits.

13. Apparatus for determining the characteristic of a material comprising in combination an oscillatory exciting circuit, an oscillatory receiving circuit electrically coupled thereto, means for so relating a portion of the material to be tested to said receiving circuit as to vary the frequency thereof, and means for varying the coupling between said circuits in correspondence with differences in grade of the material to be tested.

14. Apparatus for determining the characteristic of a material comprising in combination an oscillatory exciting circuit, an oscillatory receiving circuit electrically coupled thereto, means for so relating a portion of the material to be tested to said circuit as to vary the frequency thereof, and means for varying the coupling between said circuits to compensate for variations in the electrical losses due to differences in grade of the material to be tested.

15. Apparatus for determining the characteristic of a material comprising in combination an oscillatory exciting circuit, an oscillatory receiving circuit electrically coupled thereto, means for so relatng a portion of the material to be tested to said receiving circuit as to vary the frequency thereof, variable means for giving said receiving circuit as to vary the frequency corresponding to the known value of said characteristic of a standard sample of said material when said sample is related to said circuit, and means for varying the coupling between said circuits to compensate for the variation in the electrical losses due to differences in grade of the material to be tested.

16. Apparatus for determining the weight of sheet material comprising in combination an oscillatory exciting circuit, an oscillatory receiving circuit electrically coupled thereto and including a condenser, means for associating the material to be weighed to said condenser to vary the capacity thereof, and means for varying the coupling between said circuits to compensate for variations in the dielectric losses in said condenser due to differences in grade of the sheet material to be weighed.

17. Apparatus for determining the characteristic of a material comprising in combination an oscillatory exciting circuit, an oscillatory receiving circuit electrically coupled thereto, means for so associating a portion of the material to be tested with said receiving circuit as to vary the frequency thereof, variable means for giving said receiving circuit a predetermined frequency corresponding to the known value of said characteristic of a standard sample of said material when said sample is associated with said condenser, including means for indicating the setting of said variable means to produce such predetermined frequency for standard materials having widely differing degrees of said characteristic.

18. Apparatus for determining a characteristic of a material comprising in combination an oscillatory electric circuit, means for so relating a portion of the material to be tested to said circuit as to vary the frequency thereof, variable means for giving said circuit a predetermined frequency corresponding to the known value of the same characteristic of a standard sample of said material when said sample is associated with said condenser, and means for registering the setting of said variable means that gives said circuit said predetermined frequency.

19. Apparatus for determining a characteristic of a material comprising in combination an oscillatory electric circuit, means for so relating a portion of the material to be tested to said circuit as to vary the frequency thereof, variable means for giving said circuit a predetermined frequency corresponding to the known value of the same characteristic of a standard sample of said material when said sample is associated with said condenser, an indicator movable with the rotor of said variable means, a soft metal scale co-operating with said indicator and a needle on said indicator arranged to be impressed into said scale when said variable means is set to give said circuit said predetermined frequency.

20. Apparatus for determining the characteristic of a material comprising in combination an oscillatory exciting circuit, an oscillatory receiving circuit electrically coupled thereto, means for so relating a portion of the material to be tested to said receiving circuit as to vary the frequency thereof, variable means for giving said receiving circuit a predetermined frequency corresponding to the known value of said characteristic of a standard sample of said material when said sample is related to said circuit, and unitary means for altering a property of said variable means and simultaneously therewith progressively varying the coupling between said circuits.

21. Apparatus for determining the characteristic of a material comprising in combination an oscillatory exciting circuit, an oscillatory receiving circuit electrically coupled thereto, means for so relating a portion of the material to be tested to said receiving circuit as to vary the frequency thereof, and means for progressively varying the coupling between said circuits in correspondence with differences in grade of the material to be tested.

22. Apparatus for determining the characteristic of a material comprising in combination an oscillatory exciting circuit, an oscillatory receiving circuit electrically coupled thereto, means for so relating a portion of the material to be tested to said receiving circuit as to vary the frequency thereof, variable means for giving said receiving circuit a predetermined frequency corresponding to the known value of said characteristic of a standard sample of said material when said sample is related to said circuit, and means for progressively varying the coupling between said circuits to compensate for the variation in the electrical losses due to differences in grade of the material to be tested.

23. Apparatus for determining the weight of sheet material comprising in combination an oscillatory exciting circuit, an oscillatory receiving circuit electrically coupled thereto and including a condenser, means for associating the material to be weighed to said condenser to vary the capacity thereof, and means for progressively varying the coupling between said circuits to compensate for variations in the dielectric losses in said condenser due to differences in grade of the sheet material to be weighed.

24. Apparatus for determining the characteristic of a material comprising in combination an oscillatory exciting circuit, an oscillatory receiving circuit capacitively coupled thereto, means for so relating a portion of the material to be tested to said receiving circuit as to vary the frequency thereof, variable means for giving said receiving circuit a predetermined frequency corresponding to the known value of said characteristic of a standard sample of said material when said sample is related to said circuit, and unitary means for altering a property of said variable means and simultaneously therewith progressively varying the coupling between said circuits.

25. Apparatus for determining the characteristic of a material comprising in combination an oscillatory exciting circuit, an oscillatory receiving circuit capacitively coupled thereto, means for so relating a portion of the material to be tested to said receiving circuit as to vary the frequency thereof, variable means for giving said receiving circuit a predetermined frequency corresponding to the known value of said characteristic of a standard sample of said material when said sample is related to said circuit, and means mechanically connected with said variable means for varying the coupling between said circuit simultaneously with the variation of a property of said variable means.

26. Apparatus for determining the characteristic of a material comprising in combination an oscillatory exciting circuit, an oscillatory receiving circuit, a condenser electrically coupling said circuits, means for so relating the material to be tested to said receiving circuit as to vary the frequency thereof, a condenser associated with said receiving circuit for giving the same a predetermined frequency corresponding to the known value of said characteristic of a standard sample of said material when said sample is related to said circuit, and a condenser electrically associated with the first mentioned condenser and mechanically connected with the second mentioned condenser for varying the coupling between said circuits simultaneously with the variation of the second mentioned condenser.

27. The method of determining the characteristic of a material which consists in relating a standard sample of such material having a known value of such characteristic to a condenser in an oscillatory electric circuit, thereby varying the capacity of said condenser and the frequency of said circuit proportionally to such characteristic of said sample, changing the frequency of said circuit to a predetermined value while said sample is still related to said condenser, removing said sample, and then progressively relating successive portions of the material to be tested to said condenser, and finally continuously determining the amount of the resulting variation in the frequency of said circuit from said predetermined value.

28. The method of determining a characteristic of a material consisting in relating a standard sample of said material to a condenser thereby giving said condenser a predetermined capacity proportional to said characteristic of said sample, removing said sample, and then progressively relating to said condenser successive portions of the material to be tested, thereby varying the capacity of said condenser proportionally to the same characteristic of said material to be tested, and finally continuously determining the amount of such variations from said predetermined capacity.

In testimony whereof I have affixed my signature.

ALBERT ALLEN.